United States Patent
Kalb

(10) Patent No.: US 7,550,867 B2
(45) Date of Patent: Jun. 23, 2009

(54) METHOD AND SAFETY SYSTEM FOR A DISPLACEMENT DEVICE OF A MOTOR VEHICLE

(75) Inventor: Roland Kalb, Rossach (DE)

(73) Assignee: Brose Fahrzeugteile GmbH & Co KG, Coburg (DE)

( * ) Notice: Subject to any disclaimer, the term of this patent is extended or adjusted under 35 U.S.C. 154(b) by 547 days.

(21) Appl. No.: 10/523,496

(22) PCT Filed: Aug. 6, 2003

(86) PCT No.: PCT/DE03/02690

§ 371 (c)(1),
(2), (4) Date: Nov. 10, 2005

(87) PCT Pub. No.: WO2004/020258

PCT Pub. Date: Mar. 11, 2004

(65) Prior Publication Data

US 2006/0108874 A1        May 25, 2006

(30) Foreign Application Priority Data

Aug. 7, 2002    (DE) ............................... 102 36 106

(51) Int. Cl.
*B60R 25/00*    (2006.01)
*H01H 47/22*    (2006.01)
*E05B 65/20*    (2006.01)
*E05B 65/36*    (2006.01)

(52) U.S. Cl. ..................... 307/10.2; 307/10.6; 70/262; 70/263; 70/264; 70/265; 180/281; 180/286; 180/289

(58) Field of Classification Search ................ 307/10.6, 307/10.2; 70/262, 263, 264, 265; 180/281, 180/286, 289
See application file for complete search history.

(56) References Cited

U.S. PATENT DOCUMENTS 5,534,846 A * 7/1996 Kuroda .................. 340/426.28

(Continued)

FOREIGN PATENT DOCUMENTS

DE            41 26 375 A1    2/1993

(Continued)

OTHER PUBLICATIONS

International Search Report of PCT/DE2003/002690, dated Jan. 12, 2004.

*Primary Examiner*—Albert W Paladini
*Assistant Examiner*—Hal I Kaplan
(74) *Attorney, Agent, or Firm*—Christie, Parker & Hale, LLP.

(57) ABSTRACT

A safety system for a locking device of a motor vehicle includes a unit control device which has at least one power switch for controlling an electromechanical unit in a blocking state, a central control device including signal links to the unit control device and further unit control devices of the motor vehicle, at least the electromechanical unit being controllable through the central control device via the signal links, and an electrical lead connection which is independent of the signal links. The unit control device is connected to the central control device through the independent electrical lead connection. A potential of a control connection of the power switch or a power connection of the unit control device is controllable by the central control device via the independent electrical lead connection.

15 Claims, 5 Drawing Sheets

U.S. PATENT DOCUMENTS

| | | | | |
|---|---|---|---|---|
| 5,777,395 A | * | 7/1998 | Rathmann | 307/10.2 |
| 5,808,555 A | * | 9/1998 | Bartel | 340/5.72 |
| 5,848,366 A | | 12/1998 | Ueda | |
| 5,965,953 A | * | 10/1999 | Ikeda et al. | 307/10.2 |
| 6,014,304 A | * | 1/2000 | Burnus et al. | 361/103 |
| 6,111,326 A | | 8/2000 | Miyata et al. | |
| 6,133,646 A | * | 10/2000 | Segawa et al. | 307/10.1 |
| 6,278,250 B1 | | 8/2001 | Sasaki | |
| 6,515,377 B1 | | 2/2003 | Übelein et al. | |
| 6,548,915 B1 | | 4/2003 | Geber et al. | |
| 6,559,614 B2 | | 5/2003 | Kock et al. | |
| 6,629,512 B2 | * | 10/2003 | Iwatani et al. | 123/41.14 |
| 6,798,336 B2 | * | 9/2004 | Kanda et al. | 340/5.61 |

FOREIGN PATENT DOCUMENTS

| | | |
|---|---|---|
| DE | 43 38 707 A1 | 5/1995 |
| DE | 44 04 501 C2 | 8/1995 |
| DE | 196 21 776 A1 | 12/1996 |
| DE | 197 41 438 C1 | 12/1998 |
| DE | 199 28 101 C2 | 1/2001 |
| DE | 199 46 993 A1 | 4/2001 |
| DE | 100 00 532 A1 | 7/2001 |
| DE | 100 49 616 C1 | 4/2002 |
| DE | 100 62 548 A1 | 6/2002 |
| EP | 0 869 040 A2 | 10/1998 |
| EP | 1 033 464 A2 | 9/2000 |
| EP | 1 044 857 A2 | 10/2000 |
| EP | 1 060 922 A1 | 12/2000 |
| GB | 2 331 789 | 6/1999 |
| GB | 2 336 221 A | 10/1999 |

* cited by examiner

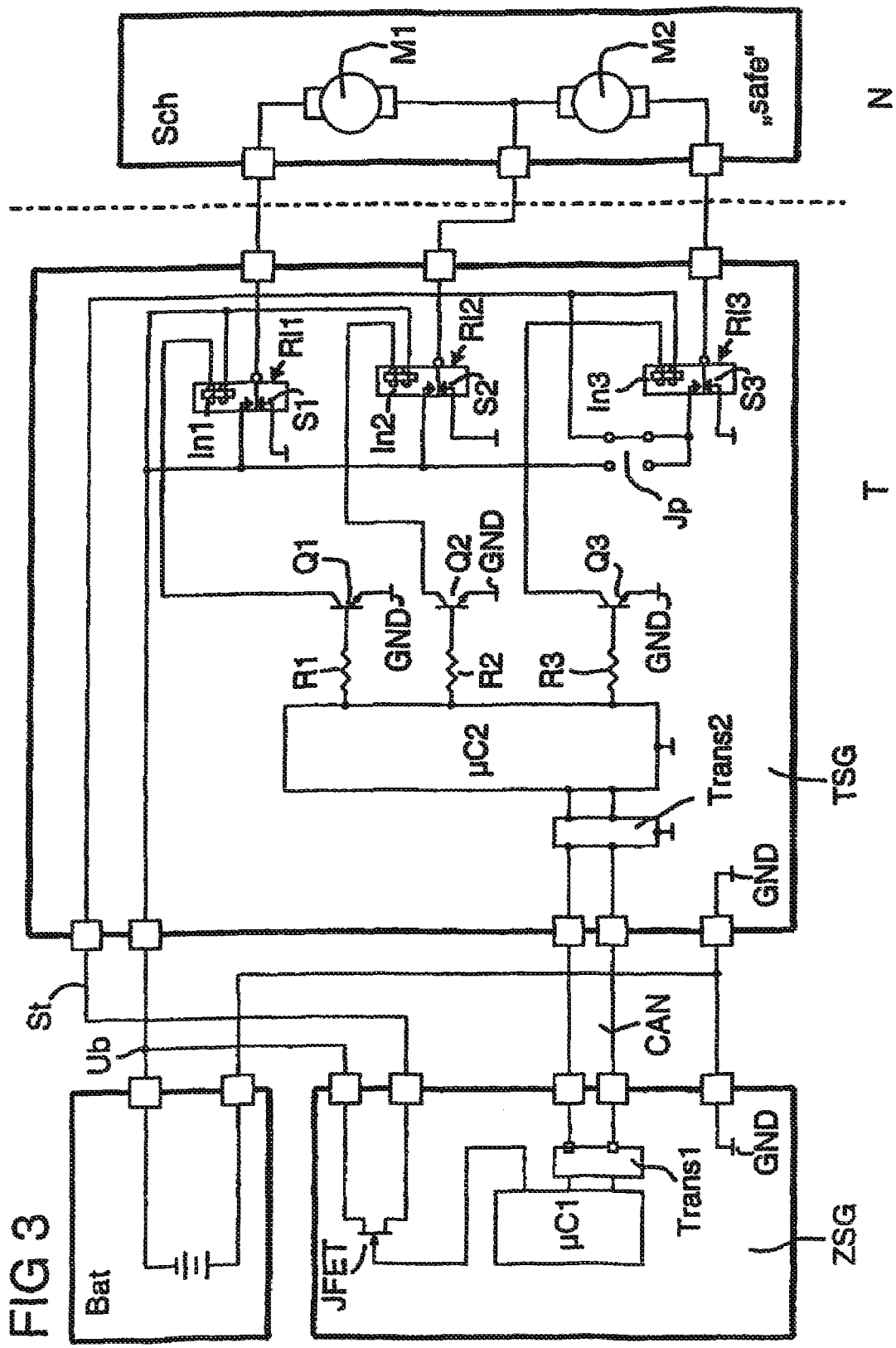

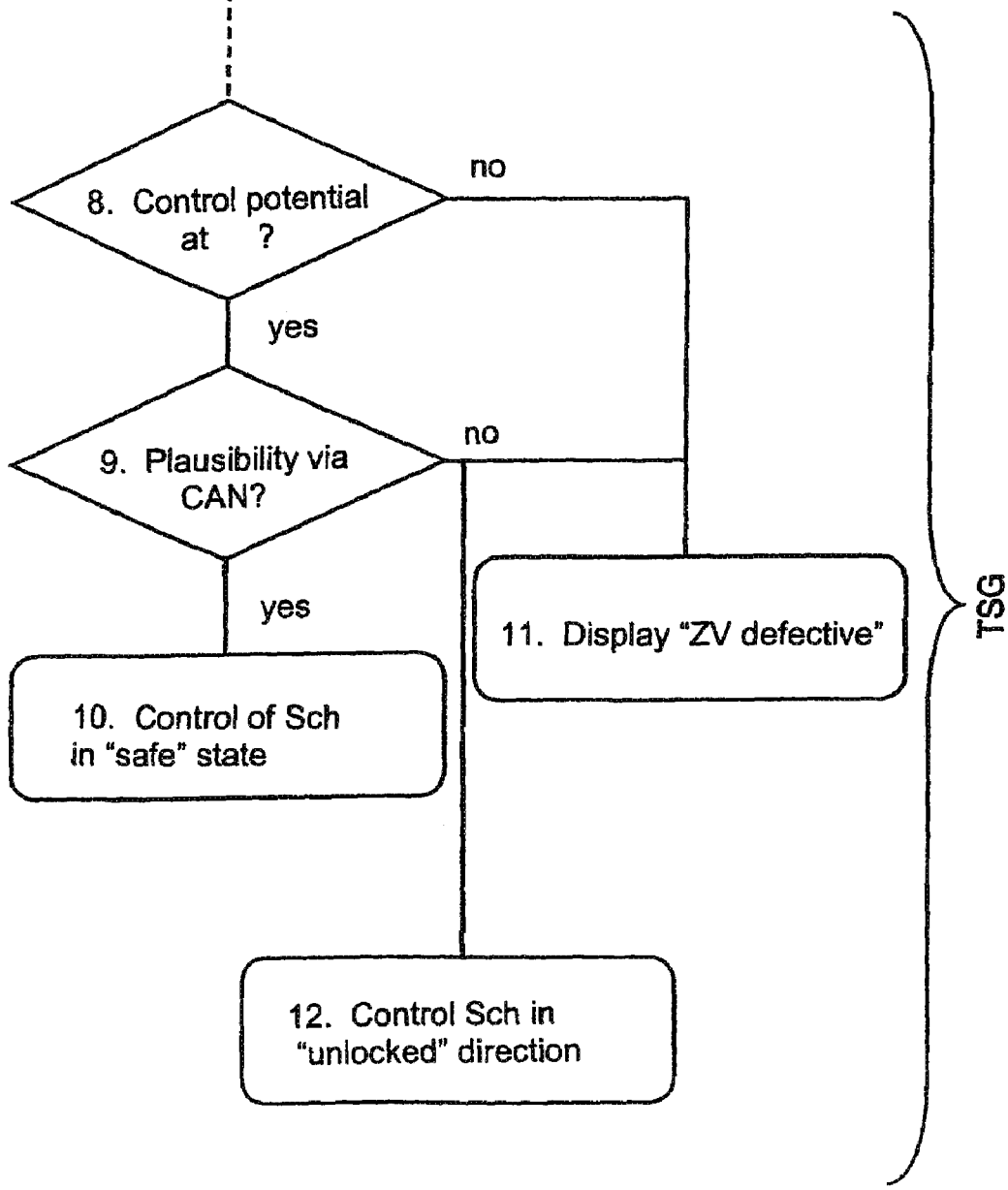

METHOD AND SAFETY SYSTEM FOR A DISPLACEMENT DEVICE OF A MOTOR VEHICLE

PREVIOUSLY AMENDED CROSS-REFERENCE TO RELATED APPLICATION(S)

This application is a National Phase patent application of International Application Number PCT/DE2003/002690, filed on Aug. 6, 2003, which claims priority of German Patent Application Number 102 36 106.1, filed on Aug. 7, 2002.

BACKGROUND OF THE INVENTION

1. Field of the Invention

The invention relates to a method and a safety system for a locking device for a motor vehicle.

2. Prior Art

From the prior art it is known to use serial data protocols of a bus technology in the motor vehicle for data transfer between electronically controlled devices. Thus by way of example the individual body control devices are linked, such as the central body electronics, combination instruments and control devices in the doors. From the central body electronics, a central control device in the motor vehicle, trigger signals are generated more particularly for the central locking function and are transferred to the executing control devices by means of a serial data protocol. The locking function is thereby dependent on these trigger signals.

Furthermore it is known in the event of a complete breakdown of the bus system to switch the door control devices over automatically into an emergency operating mode in order to enable the functions pertaining to safety which are dependent on being triggered. It has however been seen that even with a breakdown of one part of the electronics which are connected through the bus (central control device or further instruments of the motor vehicle connected thereto) important or even all functions of the displacement systems can be blocked because a failed electronics unit could no longer supply the data which was necessary to generate the trigger signals. Such emergency operating modes for window lifters are known for example from EP 1 060 922 A or DE 199 28 101 C2.

Furthermore the technical functioning of the displacement systems is dependent on the functional ability and reliability of the control devices. Breakdown situations which lead to a partial failure of the control electronics run the risk of generating parasitic resistances which clearly reduce insulation between two conductor paths of the electronics of the door control device. Parasitic resistances caused in this way can have values of some hundred ohms. If this resistance arises between a control connection of a power switch and a fixed potential, more particularly the battery voltage or the earth connection, then this can lead to undesired control of the power switch and consequently to an undesired adjustment of the displacement device.

The breakdown of parts of the vehicle electronics, more particularly the bus system or the control device through crash effects can lead to the undesired displacement of the displacement device in the emergency accident situation and to additional dangers.

SUMMARY OF THE INVENTION

The object of the invention is to provide a method and system for safeguarding a locking device of a motor vehicle which enables the opening of the locking device in the event of a breakdown of parts of the system, and at the same time reduces the risk of automatic responses in a non-desired state or manual faulty functions.

According to this object, a safety system is provided for a locking device of a motor vehicle, the safety system comprising a control device which has at least one power switch for actuating an electromechanical unit into the blocking state, also termed safe state and which can additionally be controlled through a central control device. This blocking state differs from the locking states "unlocked" and "locked" of the locking device of the vehicle door.

If the electromechanical unit is in the unlocked state the motor vehicle door can be opened manually both from outside and from inside the vehicle. In addition, the motor vehicle door can be opened automatically by means of a motorized central locking system.

In the locked state the motor vehicle door can no longer be opened from the outside of the vehicle, but still all mechanical functions of the electromechanical unit are activated, so that the motor vehicle door can be opened from inside of the vehicle. The opening may also still be possible from the outside by an extra aid using a predefined tool, in case the vehicle user has accidentally been locked out of the vehicle.

In order to prevent theft of the vehicle, the electromechanical units of the motor vehicle can be moved into the blocking state. In the blocking state all mechanical functions of the electromechanical unit are deactivated, so that the vehicle door cannot be opened using the predefined tool or manually from the inside of the vehicle.

These different states are caused through the electromechanical unit which produces at least the states unlocked locked and blocking through the supply of electrical energy by means of mechanical adjustments. The states described can in principle be different for the relevant vehicle doors or also a trunk door of the motor vehicle.

The states of all the locking units of one vehicle are preferably tuned with each other through the central control device by means of serial data protocols.

For this a central control device is provided which has signal links, more particularly a serial bus connection to the control devices of the relevant door of the motor vehicle. These signal links enable data transfer to produce the desired states in that the electromechanical unit can be controlled through the central control device via the signal links. By way of example the signal links enable a data transfer to transmit the desired states from the central control device to the relevant control devices for controlling the local locking device.

Data transfer is constituted in a simple case by a signal, a voltage or binary data being indicative of the relevant situation. More complex links enable an improvement in the reliability of the transfer and the transfer of commands, status data and/or diagnosis data of the electromechanical unit or from operating elements.

In order to provide a secure system, the door control device is connected to the central control device through an electrical lead connection which is independent of the signal links. For the lead connection to be independent from the signal links, it is necessary that the voltages or signals transferred via the signal links do not influence the independent electrical lead connection. A particularly expedient simple design of the invention proposes that a separate conductor which is electrically insulated from the signal links is used as the independent electrical lead connection.

A potential of a control connection of the previously mentioned power switch can be controlled by the central control device through this independent electrical lead connection for energizing the electromechanical unit or a power connection of the control device which can be connected to the electromechanical unit. The control is preferably undertaken directly by connecting the control connection or power connection electrically and directly to the central control device through the independent electrical lead connection. Alternatively the potential of the relevant connection could also be controlled indirectly by the central control device by switching a further logic element, by way of example a switch transistor in between the independent electrical lead and the relevant connection.

Consequently the actuation is carried out with an additional enabling control being provided via the independent electrical lead connection by the central control unit to the relevant local control devices, wherein without this enabling an actuation of the electromechanical unit into the blocking state is not possible.

According to a further advantageous embodiment of the invention the central control device only enables the actuation of the electromagnetic unit into the blocking direction when the functional capacity of the serial data transfer is ensured through the signal link, which can happen for example through a continuous status enquiry of all the control devices and central control devices involved. For this the central control device has advantageously an evaluation device which is designed for controlling the power connection in dependence on a state or an emergency operation of the signal links. This evaluation device interrogates cyclically for example the junctions of a bus system of the signal links in order to check their functional ability and the functional ability of the signal links. More advantageously, additional vehicle states are evaluated, more particularly the ignition state. A switched-off ignition is thereby a further condition for controlling the potential of the control connection. If at least one condition is not fulfilled, for example the failure of the serial data protocol as a result of physical actions in the event of a crash, the enabling condition is not fulfilled, i.e. this is set back so that the potential to the independent electrical lead connection is not controlled through the central control device.

An advantageous development of the invention proposes that for control the potential can be switched to this independent electrical lead connection. Preferably the output of the central control device has for this switch process a low-resistance output which clearly reduces the tendency of this independent electrical lead connection to react sensitively to breakdown factors. A low-resistance output of this kind is achieved for example by using switch transistors which have in addition to the connection to the independent electrical lead connection a further connection to a current or voltage source, by way of example to a battery voltage or to earth.

As a result of the low output resistance parasitic resistances which may appear in accident situations only have a slight influence on this potential bearing on the independent electrical lead connection. Furthermore in another embodiment of the invention the switching of the battery voltage or earth connection provides the possibility of transferring through this independent electrical lead connection the drive energy for the electromechanical unit at least for an adjusting direction.

In a further development of the invention the central control unit has at least one switch for switching at least two different potentials. These potentials are by way of example the said earth potential or the battery voltage potential. If on the other hand a digital evaluation of the potential is preferred then a logic level, for example a level of 5 volt can also be used as one of the two different potentials. By way of switching over the two potentials it avoids that in one time state a high-resistance output of the central control device leads to an undefined potential at the independent electrical lead connection.

In order to further increase the security of this safety system, in a particularly advantageous development of the invention for controlling the blocking state the control of the potential through the central control device and a control through the logic of the control device are logically AND-linked. The logic of the door control device is thereby for example a micro controller integrated in the door control device which can in turn be connected through one of the signal links to the central control device. Through this logic AND-link a safety redundancy is generated which further reduces the influence of parasitic resistances. Furthermore it can be checked when checking the input states of the logic AND-link whether the control device of the door and the central control device are in the normal operating mode.

An advantageous development of this design of the invention proposes that for the logic AND-link the switch of the central control device and a switch of the logic of the door control device form a series connection. The switches are preferably mechanical switches, more particularly switch transistors which in turn have a control connection. A first sub-variation of this development of the invention proposes that both switches are connected together electrically directly. Alternatively this second sub variation of this development proposes that both switches are connected together through a further element more particularly through at least one connection of the power switch or power connection of the door control device. The potential for controlling the power switch is preferably switchable between the earth potential and a control potential which can be less than or equal to the battery potential.

In order to achieve a further increase in the safety of this safety system in a further advantageous development of the invention in each local control device for controlling the electromechanical unit a preferably permanent plausibility check takes place in which the potential of the independent electrical lead connection is only then applied if the conditions "ignition off" and "undisturbed signal connections" are met.

A preferred embodiment of the invention proposes that the connections are a constituent part of a bus system. This bus system is preferably a CAN-bus system which enables a link with the central control device and further devices of the motor vehicle. If at least a bi-directional link, for example that of a CAN-bus, is used then a transfer of status data is possible between the devices of the motor vehicle. In addition to the status data, further information on an operating mode, for example an emergency operation during an accident situation or a defect in the devices and a normal operating mode, can be transferred. Further developments of this embodiment additionally permit a transfer of diagnostic data through the CAN-bus system which register the updated reliability of individual elements of the safety system, more particularly the reliability of the potentials and the independent electrical lead connection to the central control device.

A particularly advantageous development of the invention proposes that the control device has a micro controller. A constituent part of this micro controller is for example a logic which enables the logical AND-link to the control of the central device. Furthermore this micro controller serves to control and evaluate further operations of the function elements of the motor vehicle door. This micro controller is furthermore connected for control to the power switch through its control connection. For this an output PIN of the micro controller can be connected directly to a discrete power switch in the form of a power transistor or a relay.

Alternatively an indirect switching is also possible through a further logic of the control device of the door or through a logic of the central control device. For controlling the relay the connection can advantageously be through a driver transistor for energizing the relay coil. As an alternative to the connection through lead elements of a plate it is possible to integrate the micro controller together with the power switch on a semiconductor chip as so-called smart power technology.

In a further advantageous development of the invention it is proposed that the micro controller of the control device is in active connection with the independent electrical lead connection for evaluation. This active connection enables the detection of states and faulty functions of the lead connection or signals or potentials being transferred. These faulty functions can be evaluated by the control device or alternatively in an advantageous development of this form of the invention it is proposed that the micro controller of the control device transfers through one of the signal links a status of the potential of the control connection of the lead switch or the state of the electromechanical unit to the central control device. In this case an evaluation of the detected states and functional abilities through the central control device is possible in that this evaluates all time changes detected by the control device and registers by means of a plausibility check any deviation from a normal operation and where applicable starts an emergency operation. In this emergency operation mode a release is now consequently changed by way of example to actuate the electromechanical unit into the blocking direction.

In a further advantageous development of the invention a window lifter drive of the motor vehicle door can be enabled to be actuated in the closing direction through the independent electrical lead connection. By controlling the window lifter via the electrical lead connection, it can be prevented that an automatic closing operation of the window lifter is disabled in an emergency operating situation. If a critical state of the electromechanical unit is already reached and an unlocking is no longer possible, in an emergency operating case the window lifter drive is controlled so that automatic opening of the window pane for this emergency operation is possible.

One method for securing this adjusting device of a motor vehicle can be used with particular advantage. For this for example it is possible to use the safety system previously outlined or a modified safety system. Advantageously for controlling a lock of the vehicle in the blocking (safe) state in a first method step the functional reliability of a central control device and its connections are evaluated. In order to determine the operating state of the vehicle a characteristic value is evaluated. This characteristic value is for example the switched state of the ignition of the vehicle, so that blocking of the vehicle is not to take place when the ignition is switched on.

If the operating state of the vehicle for a blocking through the lock represents no danger for the occupants of the vehicle then a potential for controlling the lock is switched to an electrical lead connection which is independent of the signal links. A control command is transferred through one of the signal links of the central control device to a control device. If through the evaluation a fault-free functioning of the devices and the signal link is detected, then an electromechanical unit of the lock is energized through a power switch of the control device of the door and the lock is switched to the blocking state.

BRIEF DESCRIPTION OF THE DRAWINGS

The invention will now be explained in further detail with reference to embodiments illustrated diagrammatically in the drawings:

FIG. 3 shows a circuit plan of a safety system; and

FIGS. 4a and 4b show a flow chart of a safety process.

DETAILED DESCRIPTION OF THE DRAWINGS

Figure 1:
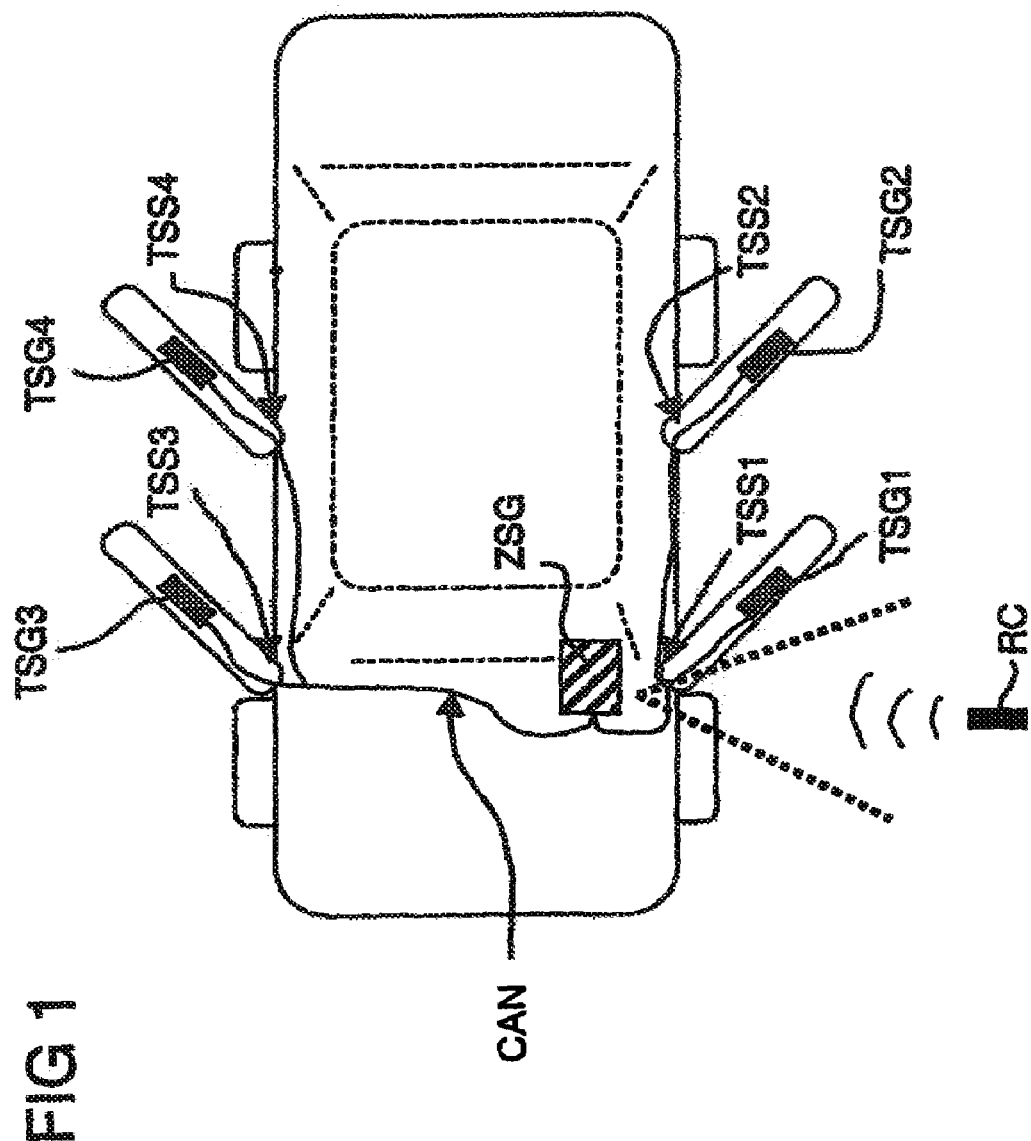
FIG. 1 shows a motor vehicle with communications structure.

FIG. 1 shows diagrammatically a motor vehicle. For communication this motor vehicle has a central control device ZSG which can be controlled optically or by radio by means of a remote control RC, by way of example by a vehicle key. This central control device ZSG is connected through a bus system CAN to door control devices TSG 1, TSG 2, TSG 3 and TSG 4. The door control devices TSG 1, TSG 2, TSG 3 and TSG 4 are disposed in the four doors of the motor vehicle. Connections is of the bus communications structure CAN are laid in the vehicle doors from inside the vehicle through door partitions TSS 1, TSS 2, TSS 3 and TSS 4 and are there connected to the door control devices TSG 1, TSG 2, TSG 3 and TSG 4.

Figure 2:
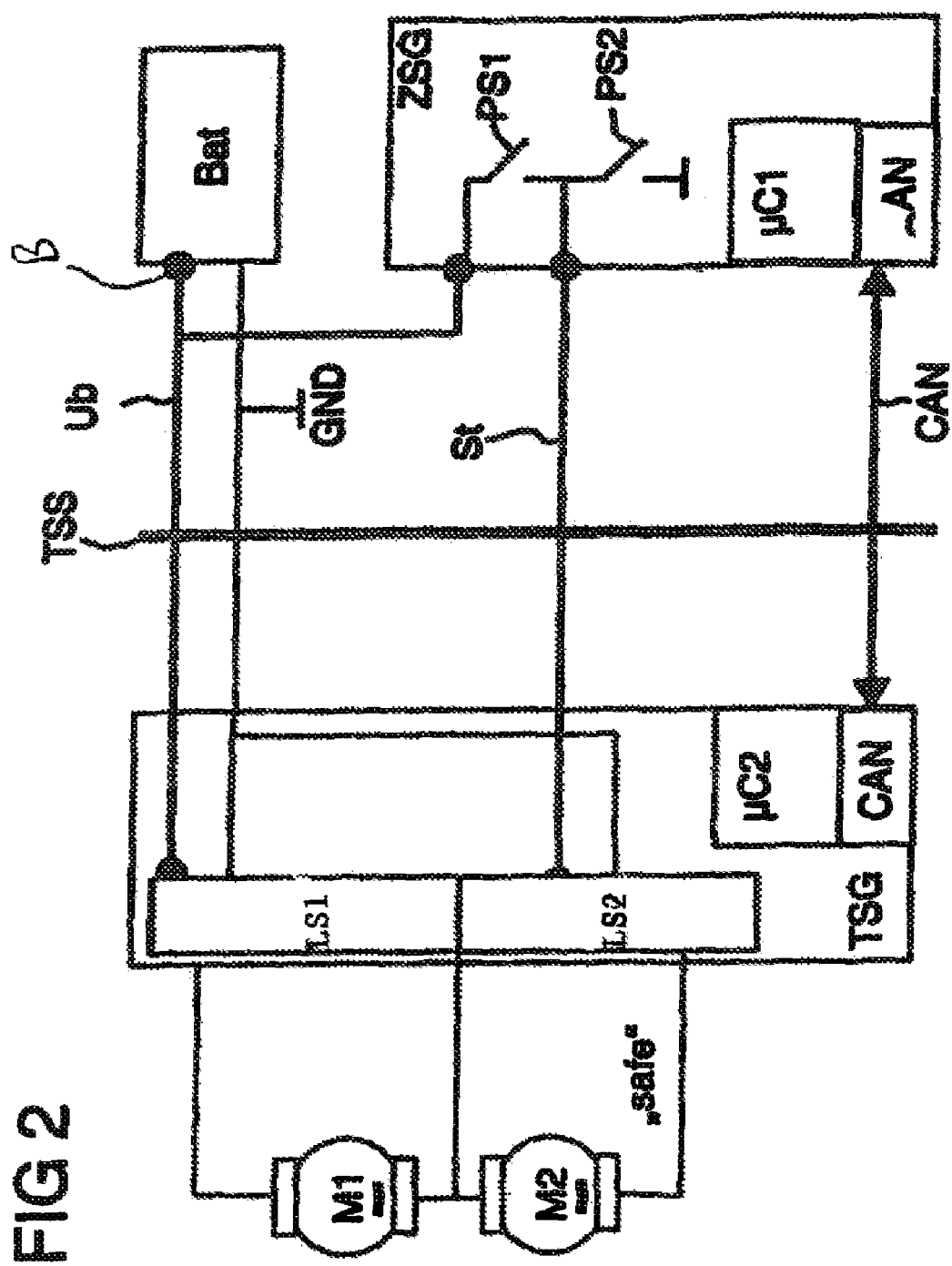
FIG. 2 shows a block circuit diagram of a safety system.

A block circuit diagram of the safety system is illustrated in FIG. 2. FIG. 2 shows by way of example a door control device TSG which is connected through an interface TSS to the central control device ZSG as well as a battery of the vehicle Bat. An analogous structure is also produced for the other door control devices of the motor vehicle. The battery Bat has two connections B and GND for a battery voltage potential Ub and the earth connection GND. Both connections are connected both to the central control device ZSG and to the door control device TSG. The central control device ZSG has a micro controller μC1 and a CAN-bus interface CAN. The CAN-bus interface CAN is connected through the CAN-bus CAN through the door partition TSS to a CAN-bus interface CAN of the door control device TSG. A further connection, St, control lead is independent of the CAN-bus and exists between the central control device ZSG and the door control device TSG. For controlling the potential of the independent electrical control lead St the central control device ZSG has two potential switches PS1 and PS2 whereby the first potential switch (control switch) PS1 is connected to the battery voltage potential Ub and to the control lead St. The second potential switch (control switch) PS2 is however connected to the control lead St and to earth GND.

The door control device TSG is apart from the link to the central control device ZSG through the CAN-bus system CAN and the independent electrical control lead St, as well as from the supply lead to the motor vehicle battery Bat, also connected to further function units of the vehicle door. Two electromechanical adjusting drives M1 and M2 are connected to the door control device TSG which has power switches LS1 and LS2 for energizing the two drives M1 and M2. The first adjusting drive M1 is an adjusting drive of a vehicle lock wherein this adjusting drive M1 serves to lock and unlock the vehicle door. The second electromechanical drive M2 serves to switch the same lock into the blocking state, thus a so-called safe state.

In order to actuate the second adjusting drive M2 by means of the second power switch LS2, the second power switch LS2 is connected by means of the control lead St to the central control device ZSG. The second power switch LS2 as well as the first power switch LS1 are constituted by mechanical power switches in the form of relays or are constituted by full- or semi-bridged semiconductors. The power switches LS1 and LS2 have for this several control inputs (not shown in FIG. 2). These control inputs are connected to the micro controller μC2 of the door control device TSG and control lead St or further input wiring.

In order to move the lock into the blocking state it is first checked whether the safety system is in the normal operating mode. The central control device ZSG then switches the control lead St by means of the potential switch PS1 to the operating voltage potential Ub of the battery Bat. For this the second potential switch PS2 which has connected the control lead St previously to the earth is opened. At the next stage the central control device ZSG sends via the CAN-bus CAN a signal into the door control device TSG which contains a command to energize the second electromechanical drive unit M2.

The circuit plan illustrated in FIG. 3 shows a section of the more specific design of the embodiment shown in FIG. 2. In FIG. 3 connections from the central control device ZSG to the door control device TSG are shown, the connections being constituted by the control lead St the battery connection Ub as well as the earth connection GND. The CAN-bus system CAN is in turn provided for communication between the door control device TSG and the central control device ZSG. The door control device TSG is in turn connected to a lock Sch of a vehicle door through three current leads. The lock Sch of the vehicle door is mounted in a wet space N of the vehicle door on one side of a wet/dry separation NT and is suitably sealed against the penetration of damp.

On the other side of the wet/dry separation NT the door control device TSG is mounted on the dry space side T of the vehicle door and has no adequate damp protection from the wet space N. For communication between the door control device TSG and the central control device ZSG through the CAN-bus CAN the micro controller μC1 of the central control device ZSG and the micro controller μC2 of the door control device TSG are connected together through transceiver circuits Trans 1 and Trans 2 which provide suitable hardware for the CAN-bus control. Additionally the micro controller μC1 of the central control device ZSG is connected with a control connection with a field effect transistor JFET which enables the battery voltage Ub to be switched to the control lead St.

The micro controller μC2 of the door control device TSG has three outputs which are each connected through resistances R1, R2 or R3 to driver transistors, in this case NPN bipolar transistors Q1, Q2 and Q3. The driver transistors Q1, Q2 and Q3 are each connected to a relay coil In1, In2 and In3 of a relay R11, R12 and R13 respectively, the driver transistors Q1, Q2 and Q3 thereby switch the connections of the relay coils In1, In2, In3 to earth. The other relevant connection of the relay coils In1 and In2 is connected to the battery voltage Ub, whilst the relay coil In3 is connected to the second connection to the control lead St. This third relay R13 serves to energize the second electromechanical drive unit M2 of the lock Sch in the direction of the blocking state "Safe".

In order to switch the lock into the blocking state the control St lead must consequently be switched by the field effect transistor JFET of the central control device ZSG to battery voltage potential Ub and at the same time the driver transistor Q3 has to be switched through the micro controller μC2 of the door control device TSG via the third resistance R3. Consequently in order to operate the lock in the blocking state, the driver transistor Q3 and field effect transistor JFET of the central control device ZSG must both be conducting, thus fulfilling a logical AND-condition.

The relay switches S1, S2 and S3 are provided for the actual energizing of the drive units M1 and M2 of the lock Sch. These relay switches are connected on the one hand to earth GND and on the other to the battery voltage Ub. The relay switch S3 of the third relay R13 can be connected selectively to the battery voltage Ub or to the control lead St through a so-called jumper or bridge Jp. If the relay switch S3 is additionally connected to the control lead St then the second drive unit M2 of the lock Sch is energized through the control lead St.

Instead of the relays R11, R12 and R13 illustrated in FIG. 3 it is also possible to use as an alternative power semiconductors which can also be integrated in the micro controller μC2 as smart power elements. If the semiconductor power switches are formed as discrete elements then their control is preferably counter-phased, in order to obtain with the appearance of a parasitic resistance a same-phased breakdown voltage on the control connections of the discrete power switches which does not cause any undesired switching through of the power transistors. This is particularly the case since the parasitic resistances act the same on parallel mounted conductor paths which serve to control these discrete power switches.

Figure 4A:
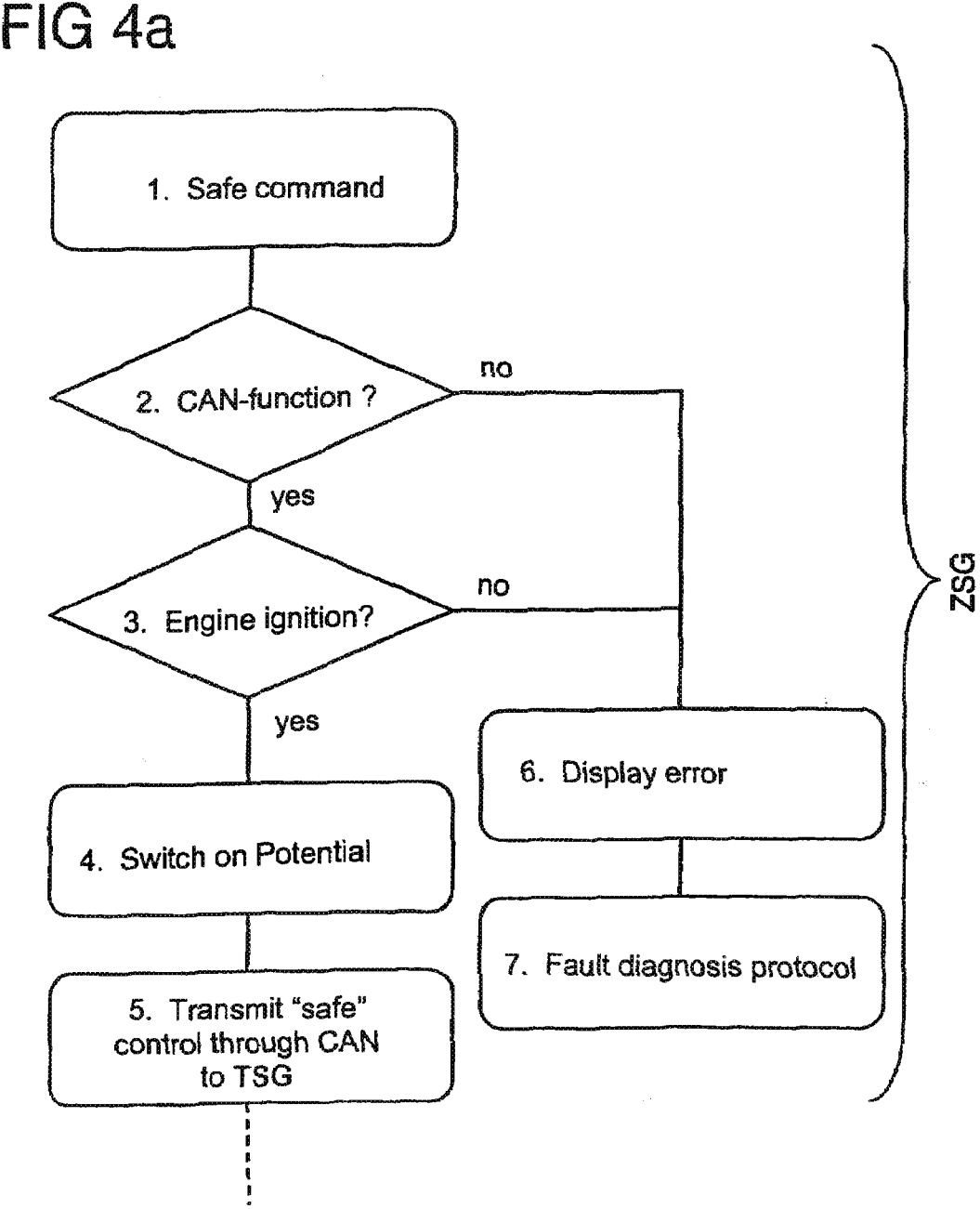

FIGS. 4a and 4b show a procedure for securing a motor vehicle lock diagrammatically by means of a flow chart. In a first step the central control device ZSG receives the command "safe", thus to move the motor vehicle doors into the blocking state. This can be carried out by way of example through a remote control or the actuation of one of the locks by means of a vehicle key. In a second step it is checked whether the connections of the CAN-bus system function fault-free. For this the central control device ZSG can check for example at least the door control devices TSG of the motor vehicle doors for functioning ability. If functioning ability of the CAN-bus connection is provided then in a third step the interrogation of a CAN value of the motor vehicle is carried out in this embodiment according to the state of the engine ignition.

If in this third step the engine ignition is switched on through the ignition key, in a fourth step in FIG. 4a the potential is applied to an independent electrical lead connection St. Then in a fifth step a safe control command is sent to the door control devices TSG from the central control device ZSG via the bus system CAN. If in the second step a fault has appeared in the CAN bus communication or if the engine ignition is inactive, in a sixth step a fault is indicated through the safety system. Then in a seventh step the fault is protocolled in a file and made available for a later fault diagnosis.

FIG. 4b shows the second part of the safety method through the safety system which proceeds in the door control device TSG. After the fifth step of FIG. 4a, the transfer of the safe control command through the CAN-bus to the door control device TSG, the control potential of the control lead St is checked in the door control device TSG through its micro controller μC1. If the control potential corresponds to the potential for blocking the vehicle door, then in a ninth step a plausibility check of the overall system takes place in which for example the communications system as well as the functional ability of the door control device TSG is checked.

If the plausibility check also produces a positive result then in the tenth method step the lock Sch is controlled into the blocking state. If in step eight the control potential is unsuitable for controlling the second electromechanical unit M2 in the blocking direction, then in step eleven a notification is displayed that the overall locking system, for example a central locking system ZV, is in a defect state. Similarly in the eleventh step the display of a defect in the central locking system ZV takes place if the plausibility check of the ninth method step produces a negative result. In this case in addition to the display in the method step eleven the lock is controlled in a twelfth step in the unlocking direction in order to be able to ensure that any person who may be in the vehicle can leave the vehicle if the lock was not able to pass into the blocking (safe) state.

Accordingly the detection of a fault triggers a display of a critical state in a vehicle display for the vehicle user and the door locks are controlled into the unblocked state. An end position in the safe region is consequently possible through the lock mechanism only via the intermediate position locked so that in the event of a fault two conditions have to be met in order to bring the vehicle door from the unlocked state into the locked state.

The invention claimed is:

1. A safety system for a locking device of a motor vehicle comprising:
    a unit control device comprising at least one power switch for actuating an electromechanical unit into a blocking state;
    a central control device comprising signal links to the unit control device and further unit control devices of the motor vehicle, the electromechanical unit being controllable through the central control device via the signal links; and
    an electrical lead connection being independent of the signal links;
    wherein the unit control device is connected to the central control device through the independent electrical lead connection, and wherein the power switch of the unit control device is controllable by the central control device via the independent electrical lead connection, the central control device thus enabling, via the independent electrical lead connection, the unit control device to actuate the electromechanical unit into the blocking state, the actuating not being possible without the enabling by the central control device.

2. A safety system according to claim 1 wherein the central control device comprises an evaluator device formed by a micro controller which is designed to control the power connection in dependence on a state or an emergency operation of the signal links.

3. A safety system according to claim 1 wherein for control, the central control device is constituted to apply a potential to the independent electrical lead connection.

4. A safety system according to claim 1 wherein the central control device comprises at least one switch for switching the independent electrical lead connection between at least two different potentials.

5. A safety system according to claim 4 wherein for controlling the blocking state, the central control device and a logic of the unit control device are linked by a logical AND-link formed by a series connection of the switch of the central control device and a switch of the logic of the unit control device.

6. A safety system according to claim 1 wherein for controlling the power switch of the unit control device, a potential applied to the independent electrical lead connection is switchable, by the central control device, between an earth potential and a control potential which is smaller than or equal to a battery potential.

7. A safety system according to claim 1 wherein the signal links are a constituent part of a BUS-system.

8. A safety system according to claim 1 wherein the unit control device comprises a micro controller which is connected to the control connection for controlling the power switch.

9. A safety system according to claim 8 wherein the micro controller of the unit control device is connected to the independent electrical lead connection for evaluation of a potential of the independent electrical lead connection.

10. A safety system according to claim 9 wherein the micro controller of the unit control device is designed for transferring a status of the potential of the independent electrical lead connection, power switch or state of the electromechanical unit to the central control device through one of the signal links.

11. A safety system according to claim 1 wherein the unit control device is mounted in a vehicle door and the central control device is mounted outside of the vehicle door, but inside the motor vehicle.

12. A safety system according to claim 1 wherein a relay constituting a power switch is controllable via the independent electrical lead connection connected to a relay coil of the relay.

13. A method for safeguarding a locking device of a motor vehicle, the method comprising, for actuating a lock of the motor vehicle into the blocking state, the steps of:
    evaluating the functioning of a central control device and signal links of the central control device;
    applying a potential for controlling the lock to an electrical lead connection independent of the signal links of the central control device;
    transferring a control command through one of the signal links of the central control device to a unit control device; and
    actuating an electromechanical unit of the lock through a power switch of the unit control device in dependence on the potential if a fault-free functioning of the central control device and the signal links is detected during the evaluating.

14. A method for safeguarding a locking device of a motor vehicle by preventing an unintended actuation of a lock of the motor vehicle into a blocking state in the event of a failure, breakdown or emergency operation of a bus system of the motor vehicle, comprising the steps of:
    detecting the failure or breakdown through a central control device of the motor vehicle and initiating an emergency operation or transferring information on an initiated emergency operation from a unit control device through the bus system to the central control device, and
    applying a potential to a lead connection which is connected to the unit control device and is independent of the bus system,
    wherein the applying is performed by the central control device, and wherein in dependence on the potential applied to the lead connection an actuation of the locking device into the blocking state is prevented.

15. A method according to claim 13 wherein the unit control device is a door control device.

* * * * *